(12) United States Patent
Bergman et al.

(10) Patent No.: US 8,918,521 B2
(45) Date of Patent: Dec. 23, 2014

(54) BATCHING OF MESSAGES FOR MOBILE ENDPOINT

(75) Inventors: Joel Bergman, Kirkland, WA (US); Jon Changzheng Xu, Seattle, WA (US); Gerardo Garcia, Sammamish, WA (US); Ashwini Kumar Varma, Renton, WA (US)

(73) Assignee: Microsoft Corporation, Remond, WA (US)

( * ) Notice: Subject to any disclaimer, the term of this patent is extended or adjusted under 35 U.S.C. 154(b) by 1013 days.

(21) Appl. No.: 12/477,660

(22) Filed: Jun. 3, 2009

(65) Prior Publication Data
US 2010/0312830 A1    Dec. 9, 2010

(51) Int. Cl.
| | |
|---|---|
| *G06F 15/16* | (2006.01) |
| *H04L 12/58* | (2006.01) |
| *H04L 29/08* | (2006.01) |
| *H04W 4/16* | (2009.01) |
| *H04W 4/12* | (2009.01) |
| *H04W 76/04* | (2009.01) |

(52) U.S. Cl.
CPC .......... *H04L 12/5855* (2013.01); *H04L 67/148* (2013.01); *H04W 4/16* (2013.01); *H04L 12/5815* (2013.01); *H04L 12/5895* (2013.01); *H04L 51/043* (2013.01); *H04L 51/14* (2013.01); *H04W 4/12* (2013.01); *H04W 76/048* (2013.01); *H04L 67/14* (2013.01); *H04L 67/145* (2013.01); *H04L 67/142* (2013.01)
USPC .......................................... 709/228; 709/227

(58) Field of Classification Search
CPC ............................... H04W 4/16; H04L 67/148
USPC ................................................ 709/227, 228
See application file for complete search history.

(56) References Cited

U.S. PATENT DOCUMENTS

| | | | |
|---|---|---|---|
| 5,001,471 A | 3/1991 | Snowden et al. | |
| 5,590,396 A | 12/1996 | Henry | |
| 6,289,464 B1 | 9/2001 | Wecker et al. | |
| 2002/0160757 A1* | 10/2002 | Shavit et al. | 455/414 |
| 2004/0204183 A1 | 10/2004 | Lencevicius et al. | |

(Continued)

FOREIGN PATENT DOCUMENTS

WO    9512955 A1    5/1995

OTHER PUBLICATIONS

Armstrong, et al., "Efficient and Transparent Dynamic Content Updates for Mobile Clients", Retrieved at <<http://www.usenix.org/events/mobisys06/full_papers/p56-armstrong.pdf>>, Proceedings of the 4th international conference on Mobile systems, applications and services, Jun. 19-22, 2006, pp. 56-68.

*Primary Examiner* — Hieu Hoang
(74) *Attorney, Agent, or Firm* — Bryan Webster; Kate Drakos; Micky Minhas

(57) ABSTRACT

Embodiments are disclosed herein that are related to preserving battery life of a mobile device. One disclosed embodiment provides, for example, in a mobile device server, a method for sending messages to a mobile endpoint utilized concurrently with a non-mobile endpoint. The method comprises receiving a first message sent from a different user and sending the first message to the mobile endpoint. The method further comprises receiving a second message sent by the user from the non-mobile endpoint and, in response, suspending a session with the mobile endpoint. In response to receiving a third message from the mobile endpoint, the method comprises resuming the session with the mobile device.

20 Claims, 6 Drawing Sheets

(56) References Cited

U.S. PATENT DOCUMENTS

| | | | |
|---|---|---|---|
| 2005/0132009 A1* | 6/2005 | Solie | 709/206 |
| 2006/0234735 A1* | 10/2006 | Digate et al. | 455/466 |
| 2007/0121808 A1* | 5/2007 | Brunson et al. | 379/67.1 |
| 2007/0165623 A1* | 7/2007 | Clark et al. | 370/389 |
| 2007/0234369 A1 | 10/2007 | Paramisivam et al. | |
| 2007/0259660 A1* | 11/2007 | Stein et al. | 455/426.1 |
| 2008/0049922 A1* | 2/2008 | Karniely | 379/205.01 |
| 2008/0096505 A1 | 4/2008 | Martinez et al. | |
| 2008/0177994 A1* | 7/2008 | Mayer | 713/2 |
| 2011/0047280 A1* | 2/2011 | Eom et al. | 709/228 |

* cited by examiner

BATCHING OF MESSAGES FOR MOBILE ENDPOINT

BACKGROUND

Various types of messaging may be used to send messages, such as text messages and email messages, between computing devices. Some messaging services may allow messages to be sent to and from multiple types of computing devices, including but not limited to mobile devices (i.e., devices configured to communicate over mobile networks) and non-mobile device (i.e., devices not configured to communicate over mobile networks, but instead to communicate over other networks, such as the Internet). This may allow a user of a messaging service to use the messaging service from both mobile and non-mobile endpoints.

In order to ensure that a user with access to multiple endpoints does not miss a message, a messaging service may be configured to send messages for that user to each of the user's devices that are currently connected to the messaging service. For example, a first user may be connected to the service through a smart phone, a notebook computer, and a laptop computer. As such, if a second user sends a message to the first user, each of the first user's devices that are connected to the shared service will receive the message.

However, in some instances, the first user may not be active at all endpoints. For example, a user working on a laptop computer may not be active at a mobile endpoint (e.g., smart phone) that continues to receive messages from the mobile service. Each message received by the mobile device, however, decreases the battery life of the device. Therefore, while it is convenient to receive messages at a plurality of endpoints, messages received while a user is not active at a mobile endpoint may by detrimental to the life of the mobile device battery.

SUMMARY

Accordingly, various embodiments are disclosed herein that are related to preserving battery life of a mobile device when it is not in use by a user. One disclosed embodiment provides, for example, in a mobile device server, a method for sending messages to a mobile endpoint utilized concurrently with a non-mobile endpoint. The method comprises receiving a first message sent from a different user and sending the first message to the mobile endpoint. The method further comprises receiving a second message sent by the user from the non-mobile endpoint and, in response, suspending a session with the mobile endpoint. In response to receiving a third message from the mobile endpoint, the method comprises resuming the session with the mobile device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Embodiments are disclosed herein that relate to a mobile device utilized by a user concurrently with a non-mobile device, where the devices are connected to a messaging service. More specifically, the embodiments relate to preserving battery life of the mobile device when it is not in use by a user. It will be understood that the term "mobile device" as used herein may include any suitable device configured to connect to a mobile device network, including but not limited to, smart phones and other cellular phones, notebook computers such as so-called "netbooks", portable media players, personal digital assistants, etc. Further, the term "mobile device server" may include any server configured to communicate with mobile devices over any suitable communications channel.

Before discussing a method to preserve the battery life of a mobile device used concurrently with a non-mobile device by a single user, an example embodiment of an example shared messaging service environment 100 is described with reference to FIG. 1. Shared messaging service environment 100 comprises a plurality n of users (depicted as three users: 102 (user 1), 104 (user 2), and 106 (user n)). Each user may have one or more communication devices including one or more mobile devices and/or one or more non-mobile devices. It will be understood that the term "non-mobile device" as used herein may include any suitable non-mobile device, including but not limited to, a desktop computer, laptop computer, mobile device connected to a data network, such as the internet, via a wireless protocol, etc.

Figure 1:
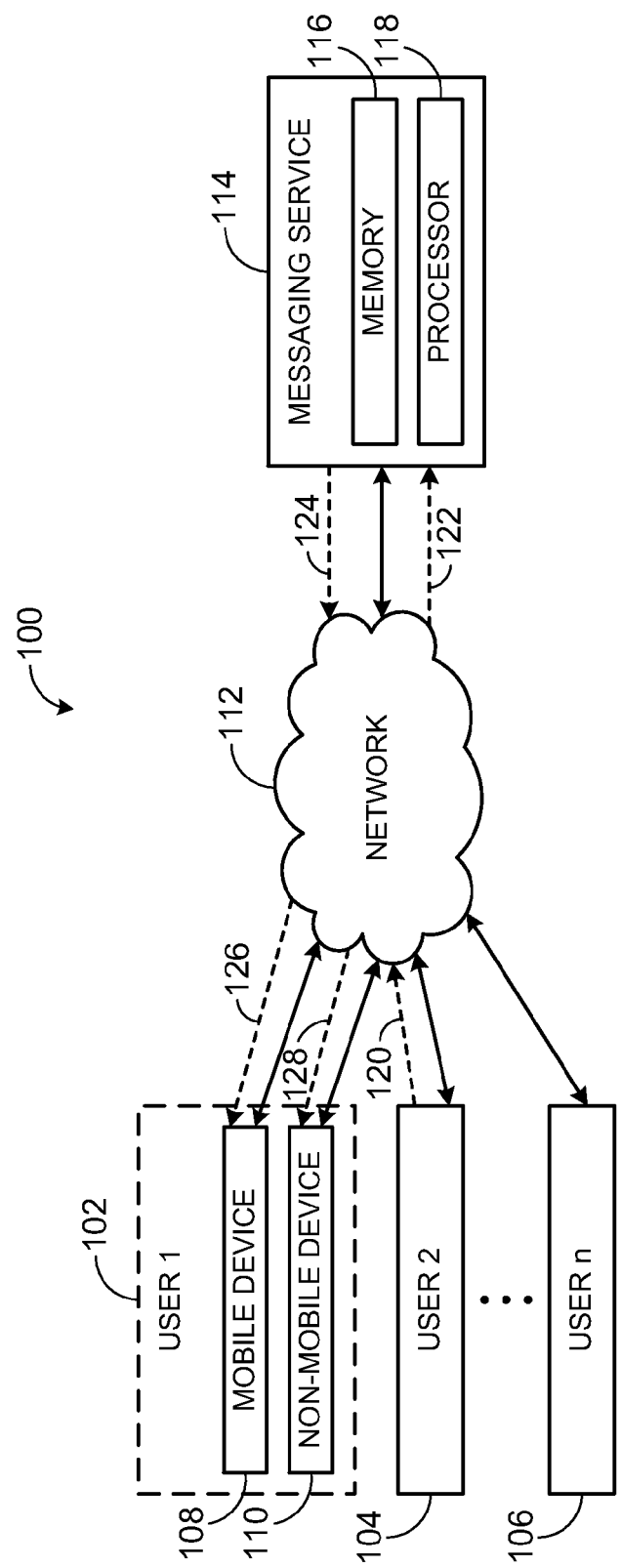
FIG. 1 shows an embodiment of an example messaging service environment.

In the example of FIG. 1, user 1 is shown having a mobile device 108 and a non-mobile device 110 that are in communication with a generic network 112. Via network 112, users may communicate with each other in various ways, including but not limited to via voice data, instant messaging, email, etc. Network 112 may represent any combination of data networks, mobile networks, and other networks over which devices may transmit data. In the depicted embodiment, three users communicating with the depicted generic network are shown for the purpose of example, but it will be understood that any suitable number of users may be in communication with any suitable number of networks.

Users 102, 104, and 106 may communicate with a shared messaging service 114 via the network 112. The shared messaging service comprises memory 116 configured to store computer-readable instructions such as applications and other programs, and a processor 118 configured to execute the applications and other programs stored in memory 116. Generally, programs include routines, objects, components, data structures, and the like that perform particular tasks or implement particular abstract data types. The term "program" as used herein may connote a single program or multiple programs acting in concert, and may be used to denote applications, services, or any other type or class of program.

Shared messaging service 114 may receive messages from the plurality of mobile devices and non-mobile devices of users 1 through n via network 112, and then route such messages to recipient mobile devices and non-mobile devices of users 1 through n.

If a user has more than one device connected the messaging service 114, then each of the connected devices may receive from the shared messaging service 114 a message sent to the user by another user. Further, if a user sends a message to another user from one device, the user's other devices connected to the messaging service 114 may also receive the message. Thus, a message that is sent by or received by user 1 102 at one endpoint (e.g., mobile device 108) is also sent to other endpoints (e.g., non-mobile device 110).

In some embodiments, mobile device 108 may communicate with shared messaging service 114 via a mobile device server (not shown), rather than communicating with the shared messaging service 114. In the example of FIG. 1, shared messaging service 114 may possess the logic of a mobile device server.

It will be understood that shared messaging service environment embodiment 100 depicted in FIG. 1 is shown for the purpose of example, and is not intended to be limiting in any manner.

As an example scenario, user 2 104 is shown sending a message to user 1 102, as indicated by dashed line 120 in FIG. 1. The message travels to the shared messaging service 114 via network 112, as indicated by dashed line 122. Once the message is received by the messaging service 114, the messaging service sends the message to user 1 102 via the network 112, as indicated by dashed line 124. Because user 1 has two communication devices connected to the shared messaging service, both devices, the mobile device 108 and the non-mobile device 110, receive the message sent by user 2, as indicated by dashed line 126 and dashed line 128.

This scenario may provide increased convenience for the user. For example, user 1 102 may be at home instant messaging via non-mobile device 110 with user 2 104 regarding where to meet for dinner. User 1 may forget the meeting location after he has left home, but he can review the conversation on his mobile device 108, as mobile device 108 receives all messages received by or sent by non-mobile device 110. Further, user 1 102 may continue his conversation with user 2 104 via mobile device 108 after leaving home.

Figure 2:
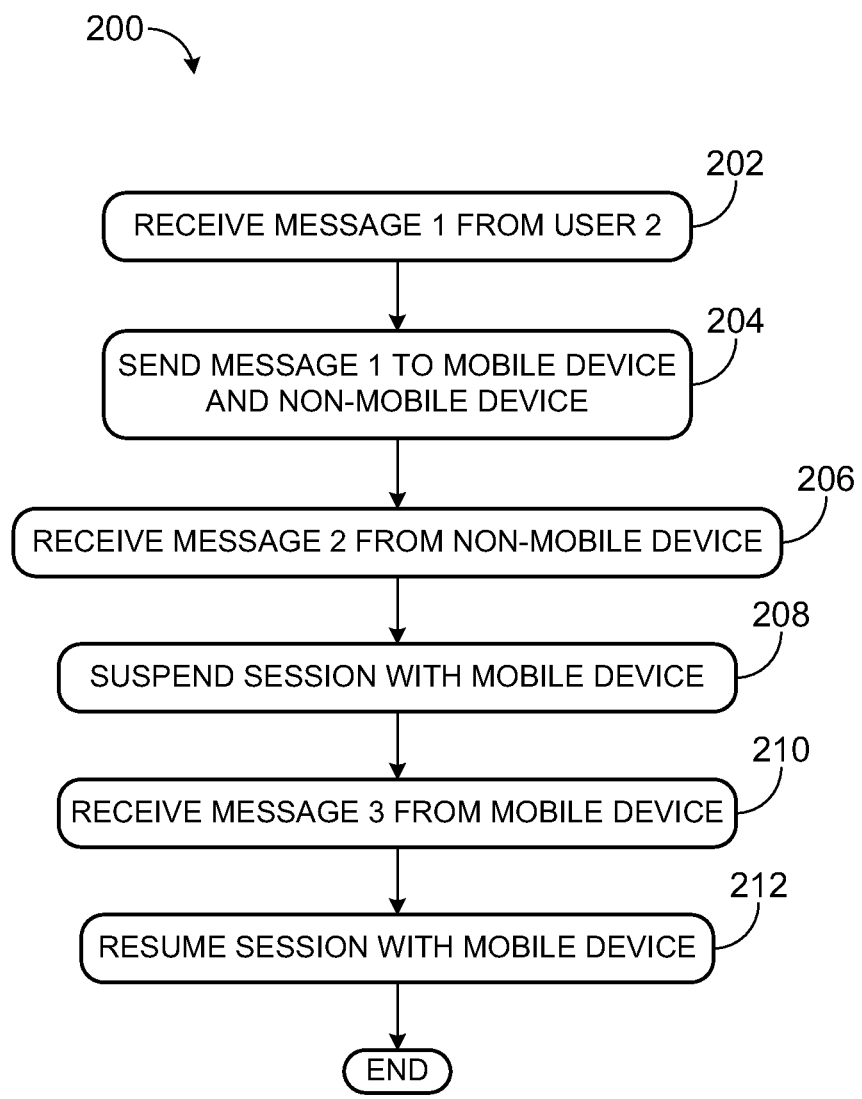
FIG. 2 shows a flow diagram depicting an embodiment of a method of sending messages to a mobile device.

On the other hand, each message mobile device 108 receives while user 1 is active at the non-mobile device 110 (and not active at mobile device 108) decreases the charge of the mobile device battery. Accordingly, FIG. 2 shows an embodiment of a method 200 for a messaging service of sending messages to a mobile device of user 1 that facilitates preserving the life of the mobile device battery when user 1 is not active at the mobile device endpoint. Method 200 comprises, at 202, receiving a first message from a second user. Once the shared messaging service receives the first message, the shared service sends the first message to the mobile device and the non-mobile device of the first user at 204. In some embodiments, the first user may have additional mobile devices and/or non-mobile devices connected to the shared messaging service; in such an embodiment, each device of the first user connected to the shared service receives message 1 from the shared service.

At 206 of method 200, the shared messaging service receives a second message, which was sent from the non-mobile device of the first user. Since the second message is sent from the non-mobile device of the first user, it is assumed that the first user is active at the non-mobile device. As such, it is also assumed that the first user is inactive at the mobile device. Thus, in order to preserve the battery life of the mobile device, the shared service suspends the session with the mobile device at 208 in response to receiving a message from the non-mobile device. During the suspended session, the mobile device does not receive messages from the shared service.

Method 200 of FIG. 2 further comprises, at 210, receiving a third message from the mobile device. In some embodiments, message 3 may be a message sent by the first user for another user. In other embodiments, message 3 may comprise a notification regarding a user-initiated action, for example, which notifies the shared service of a change in mobile device mode from an inactive mode to an active mode. Examples of such a user-initiated action may include, but are not limited to, sending a message, launching a service, changing a user status, positing to a URL, or the like.

Once the shared service receives the third message from the first user's mobile device, the status of the mobile device is changed to active and the session with the mobile device is resumed at 212 of method 200. After the session with the mobile device is resumed, the shared service begins sending messages to the mobile device again. In some embodiments, messages received by the shared service during the suspended session are stored in a cache. Upon resuming the session with the mobile device, the shared service sends the cached messages to the mobile device, as depicted in the sequence diagram of FIG. 3.

Figure 3:
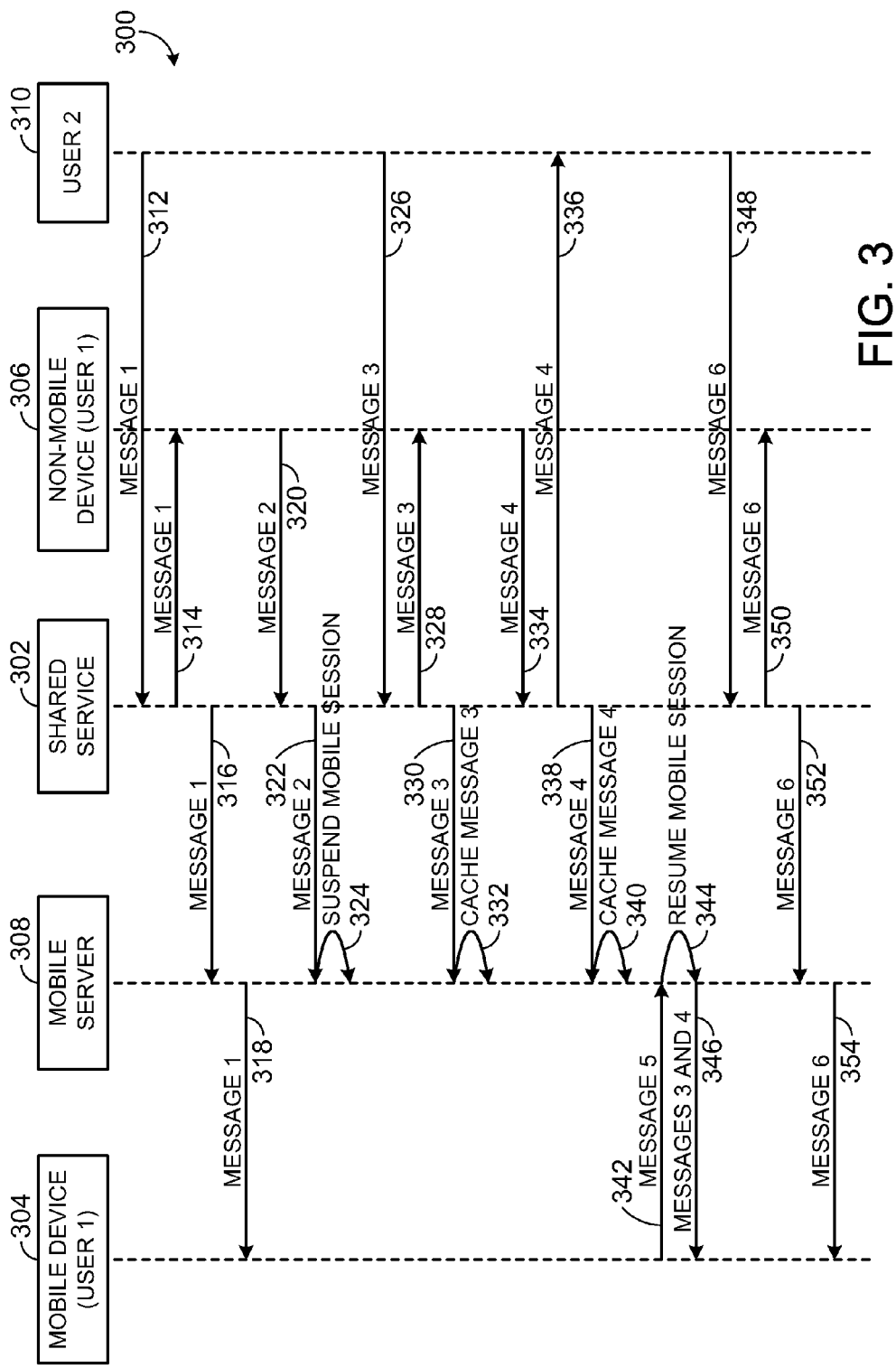
FIG. 3 shows a sequence diagram that depicts one embodiment of a method of sending messages to a mobile device.

FIG. 3 shows a sequence diagram 300 representing one embodiment of a method of sending messages to a mobile device that demonstrates how a shared messaging service 302 receives messages from and sends messages to two users, where one user is connected to the service via a mobile device 304 and a non-mobile device 306. The embodiment of FIG. 3 includes a mobile device server 308 that controls communication between the mobile device 304 and the shared service 302. Further, the embodiment of FIG. 3 includes caching messages while a session with the mobile device 304 is suspended.

The sequence of FIG. 3 begins with user 2 310 sending message 1 to user 1 at 312. Message 1 is received by the shared service and, in turn, the shared service sends message 1 to the non-mobile device of user 1 306 at 314 and to the mobile device server 308 at 316. As described above, any message received by the shared service is sent to each device of a user that is connected to the shared messaging service. Upon receiving message 1, at 318, the mobile device server 308 sends message 1 to the mobile device of user 1 304.

Next, user 1 sends message 2 via non-mobile device 306 at 320 and the message is received by the shared service 302. Message 2 may comprise a message to another user, or a message regarding a user-initiated action. For example, user 1 may have added a buddy to his buddy list via the non-mobile device 306. The shared service 302 then sends the message to the mobile device server 308 at 322. In response, the mobile device server 302 determines that user 1 is active at the non-mobile device 306 and, therefore that user 1 is inactive at the mobile device 304. In response, the mobile device server 308 suspends the session with the mobile device 304 at 324.

Next, at 326, user 2 310 sends message 3 to user 1. The shared service 302 receives message 3 and sequentially sends message 3 to the non-mobile device 306 at 328 and the mobile device server 308 at 330. Due to the suspended session with the mobile device 304, the mobile device server 308 caches message 3 at 332. Subsequently, user 1 sends message 4 (to user 2) from the non-mobile device 306 at 334. Once message 4 is received by the shared service 302, the shared service 302 sends message 4 to user 2 at 336 and to the mobile device server at 338. Since the session with the mobile device is still suspended, the mobile device server caches message 4 at 340.

Next, user 1 sends message 5 from the mobile device 304 at 342. Message 5 may comprise, for example, a message from user 1 to another user, or a notification of a change in the mobile device mode from an inactive mode to an active mode. For example, user 1 may have launched a service on the mobile device 304. As a result of the mode change of the mobile device 304, the session with the mobile device is resumed at 344 and the mobile device server sends the cached messages 3 and 4 to the mobile device 304 at 346.

Next, user 2 sends message 6 to user 1 at 348 in FIG. 3. When the shared service 302 receives message 6, the shared service sends the message to the non-mobile device 306 at 350 and to the mobile device at 352. Upon receiving message 6, and because the session with the mobile device has been resumed, the mobile device server sends message 6 to the mobile device at 354.

As shown in FIG. 3, a session with a mobile device may be suspended if the mobile device becomes inactive in order to preserve the battery life of the device. However, information that the mobile device would receive in the absence of a suspended session is not lost. By storing messages sent to the mobile device in a cache, and then sending those messages to the mobile device when the session is resumed, the battery life of the mobile device is not only preserved, but the user does not lose any information sent to the mobile device by entering a suspended session.

Figure 4:
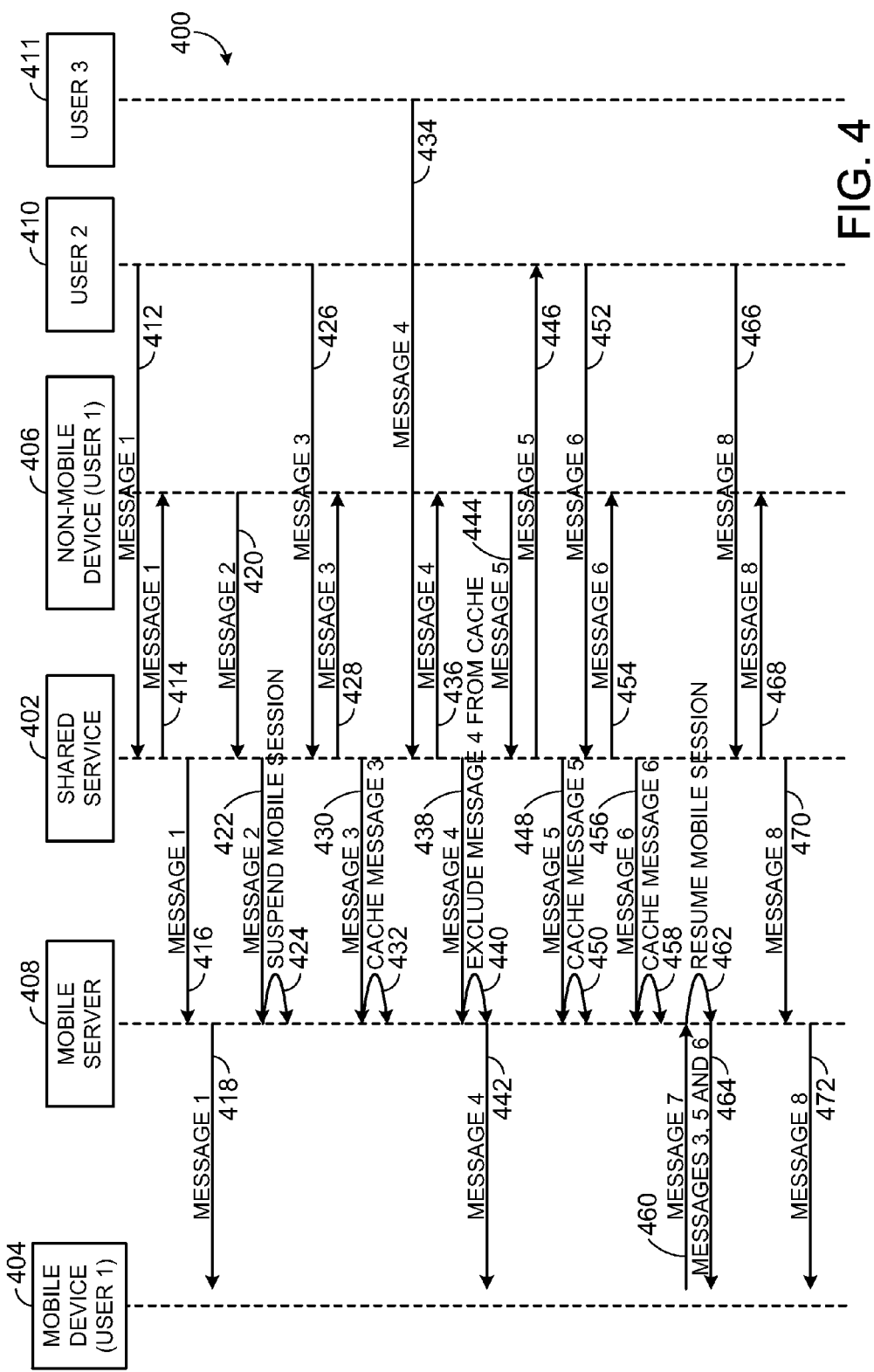
FIG. 4 shows a sequence diagram that depicts another embodiment of a method of sending messages to a mobile device.

In some embodiments, selected messages may be excluded from the cache even when a session with a mobile device is suspended. In this case, the mobile device may receive selected messages irrespective of a session suspension. FIG. 4 shows a sequence diagram 400 representing another embodiment of a method of sending messages to a mobile device that demonstrates the transmission of selected messages to a mobile device even when a session with the mobile device is suspended. As in the embodiment of FIG. 3, a mobile device server 408 controls communication between the mobile device 404 and the shared messaging service 402, and that caches messages while a session with the mobile device 404 is suspended.

In the embodiment of FIG. 4, a mobile device user may populate an exclusion list stored on the mobile device server, wherein the exclusion list comprises a list of one or more different other users that the mobile device user wishes to receive messages from, irrespective of a session suspension. For example, user 1 may wish to receive all messages from the user's mother and/or spouse regardless of whether or not he is active at the mobile device. As such, user 1 may send a message to the mobile device server indicating his mother and/or spouse is to be added to the exclusion list. In this manner, a mobile device user may customize the message caching mechanism. The exclusion list may be updated by the mobile device user at any suitable time (e.g., a message sender may be added or removed). Further still, a mobile device user may update an exclusion list from any suitable device communication device, such as a laptop computer or a desktop computer.

Continuing with FIG. 4, at 412, user 2 410 sends message 1 to user 1. Once message 1 is received by the shared messaging service 402, the shared service sends message 1 to the user 1's non-mobile device 406 at 414 and to user 1's mobile device 404 at 416. Next, user 1 sends message 2 to user 2 410 at 420. Message 2 may comprise a message to another user, or a notification regarding a user-initiated action. For example, user 1 may have opened a web browser using the non-mobile device 406, or taken any other suitable action that indicates that the user is active on the non-mobile device, and therefore potentially inactive on the mobile device. Upon receiving message 2, the shared messaging service 402 sends the message to the mobile device server 408. The mobile device server 408 then determines user 1 is active the non-mobile device 406, and therefore is inactive at the mobile device 404. As a result of this determination, the mobile device server 408 suspends the session with the mobile device 404 at 424.

Continuing with FIG. 4, user 2 sends message 3 to user 1 at 426. The shared service receives message 3 and subsequently sends message 3 to the non-mobile device 406 at 428 and to the mobile device server 408 at 430. Because the session with the mobile device 404 is suspended, the mobile device server 408 compares the sender of message 3 to the exclusion list. Message 3 is then cached at 432 upon determination that user 2 is not on the exclusion list.

Next, user 3 411 sends message 4 to user 1 at 434. After receiving message 4, the shared messaging service 402 sends message 4 to the non-mobile device at 436 and the mobile device server 408 at 438. Because the session with the mobile device 404 is suspended, the mobile device server 408 compares the sender of message 4 to the exclusion list. Upon determining that user 3 is on user 1's exclusion list, determines message 4 is to be excluded from the caching, and message 4 is sent to the mobile device 404 at 442.

At 444 in FIG. 4, user 1 sends message 5 to user 2. Upon receiving message 5, the shared messaging service sends message 5 to user 2 410 at 446 and to the mobile device server 408 at 448. The mobile device server 408 then compares the sender of message 5 to the exclusion list. Because user 1 has not added himself to the exclusion list, message 5 is added to the cache at 450.

Next, at 452, user 2 sends message 6 to user 1. When the shared messaging service 402 receives message 6, the shared messaging service 402 sends message 6 to the non-mobile device at 454 and to the mobile device server at 456. The mobile device server 408 then compares the sender of message 6 to the exclusion list and, upon determining user 2 is not in the exclusion list, adds message 6 to the cache at 458.

Next, user 1 sends message 7 from the mobile device 404 at 460. Message 7 may comprise a notification regarding a user-initiated action. For example, user 1 may have launched a service on the mobile device 404. Thus, the status of the mobile device 404 changes from an inactive mode to an active mode, and the mobile device server 408 resumes the session with the mobile device 404 at 462. Once the session with the mobile device 404 is resumed, the mobile device server 408 sends the cached messages to the mobile device 404 at 464.

Finally, user 2 sends message 8 to user 1 at 466 in FIG. 4. Upon receiving message 8, the shared messaging service 402 sends message 8 to the non-mobile device 406 at 468 and the mobile device server 408 at 470. Since the session with the mobile device 404 is no longer suspended, at 472, the mobile device server 408 sends message 8 to the mobile device 404.

Figure 5:
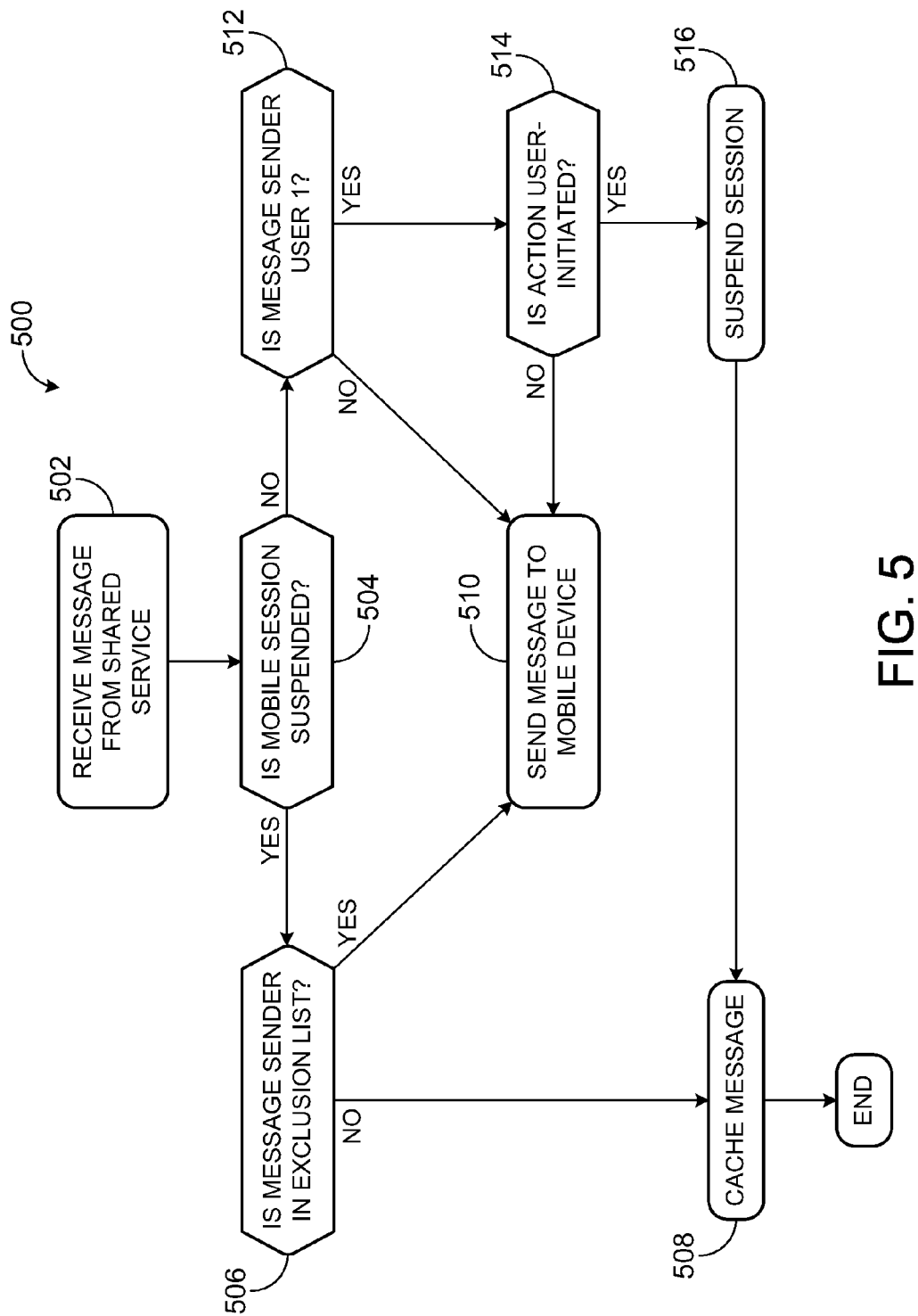
FIG. 5 shows a flow diagram that depicts an embodiment of a method for receiving messages at a mobile device message server.
Figure 6:
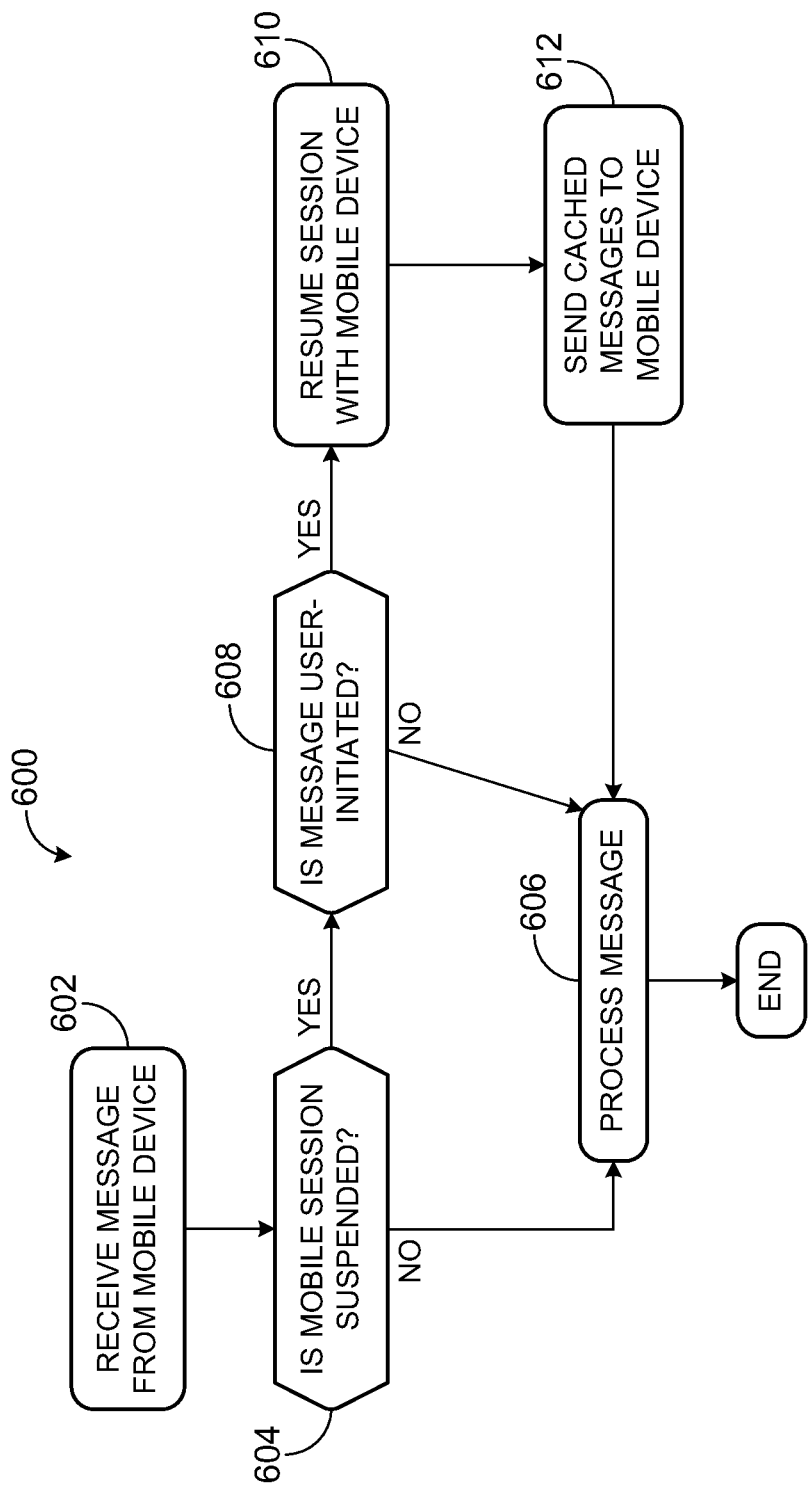
FIG. 6 shows a flow diagram that depicts an embodiment of a method for sending messages from a mobile device message server.

FIGS. 5 and 6 show examples of embodiments of methods for operating a mobile device server with regard to sending messages to the mobile device and receiving messages from the mobile device. First, FIG. 5 shows a method 500 for a mobile device server to receive messages from a shared messaging service and to send those messages to a mobile device, following in the example of FIG. 4. At 502 of method 500, the mobile device server receives a message from a shared messaging service. Upon receiving the message, the mobile device server determines if the mobile session with the mobile device is suspended at 504.

If the session with the mobile device is suspended, method 500 proceeds to 506 where it is determined if the message sender is in the exclusion list. If the message sender is not in the exclusion list, the message is cached at 508. On the other hand, if the message sender is in the exclusion list, the mobile device server sends the message to the mobile device at 510.

On the other hand, if it is determined at 504 that the session with the mobile device is not suspended, then method 500 proceeds to 512 where it is determined if the message sender is user 1 (i.e., the mobile device user). The message is then sent to the mobile device at 510 if it is determined that the message sender is not user 1 (i.e., the message sender is a different user). If it is determined that the message sender is user 1, method 500 continues to 514 where it is determined if the message was sent as a result of a user-initiated action. A user-initiated action is an action that the user performs at a device. For example, a user may launch a web browser or add a buddy to a buddy list. If the action is not user-initiated, the message is sent to the mobile device at 510. In the case that the action is user-initiated, method 500 proceeds to 516 where the mobile device server suspends the session with the mobile device. As described above, if a user-initiated action is detected at a device other than the mobile device (e.g., a non-mobile device of the user that is also connected to the shared messaging service), the mobile device server assumes the user is inactive at the mobile device and the session is suspended in order to preserve the battery life of the mobile device. Once the session with the mobile device is suspended at 516, the message is cached at 508.

FIG. 6 shows a method 600 for a mobile device server to receive messages from a mobile device. The method 600 comprises, at 602, receiving a message from the mobile device. Then, at 604, it is determined if the session with the mobile device is suspended. If the session is not suspended, method 500 continues to 606 where the message is processed by the mobile device server.

If, on the other hand, the session with the mobile device is not suspended, method 600 moves to 608 where it is determined if the message is user-initiated. If it is determined that the message is not user-initiated, the message is processed by the mobile device at 606. If it is determined that the message is user-initiated, indicating that the user is active at the mobile device, method 600 proceeds to 610 and the session with the mobile device is resumed.

Once the session with the mobile device is resumed, messages that were cached during the suspension are sent to the mobile device at 612. Finally, the message is processed by the mobile device server at 606 of method 600.

In this manner, the battery life of a mobile device may be preserved by suspending a session with the mobile device during periods of inactivity. The inactivity of a user at a mobile endpoint may be determined when a mobile device server receives a message comprising a user-initiated action from an endpoint other than the mobile endpoint, such a non-mobile device. Further, messages that are received during the suspended session may be stored in a cache and sent to the user after the session is resumed so that the user does not lose any information as a result of the suspension. Further still, a user may customize an exclusion list if there is a particular sender the user wants to receive messages from, irrespective of a suspended session with the mobile device server.

It will be appreciated that the computing devices described herein may be any suitable computing device configured to execute the programs described herein. For example, the computing devices may be a mainframe computer, personal computer, laptop computer, portable data assistant (PDA), computer-enabled wireless telephone, networked computing device, or other suitable computing device, and may be connected to each other via computer networks, such as the Internet. These computing devices typically include a processor and associated volatile and non-volatile memory, and are configured to execute programs stored in non-volatile memory using portions of volatile memory and the processor. As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that computer-readable media may be provided having program instructions stored thereon, which upon execution by a computing device, cause the computing device to execute the methods described above and cause operation of the systems described above.

It will be further understood that the configurations and/or approaches described herein for suspending a messaging session with a mobile device are presented for the purpose of example and not intended to be limiting, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and non-obvious combinations and subcombinations of the various processes, systems and configurations, and other features, functions, acts, and/or properties disclosed herein, as well as any and all equivalents thereof.

The invention claimed is:

1. A method for, in a mobile device server, sending messages to a mobile endpoint, the mobile endpoint utilized by a first user concurrently with a non-mobile endpoint, the method comprising:
  receiving a first message sent from a different user and sending the first message to the mobile endpoint and the non-mobile endpoint;
  receiving a second message sent by the first user from the non-mobile endpoint and, in response, suspending a session with the mobile endpoint, wherein suspending the session with the mobile endpoint comprises receiving and caching additional messages for the first user while the session with the mobile endpoint is suspended; and
  receiving a third message from the mobile endpoint and, in response, resuming the session with the mobile endpoint and sending the additional messages to the mobile endpoint.

2. The method of claim 1, wherein the third message received from the mobile endpoint comprises a message to another user.

3. The method of claim 2, wherein the third message received from the mobile endpoint comprises a notification regarding a user-initiated action.

4. The method of claim 3, wherein the notification regarding the user-initiated action comprises a notification of a change in mobile device mode from an inactive mode to an active mode.

5. The method of claim 1, further comprising, when the non-mobile endpoint becomes inactive, resuming the session with the mobile endpoint.

6. The method of claim 1, wherein the receiving and caching additional messages for the first user while the session with the mobile endpoint is suspended further comprises, before caching a selected message, comparing a sender of the selected message to an exclusion list, and sending the selected message to the mobile endpoint while the session is suspended if the sender is in the exclusion list.

7. A method for, in a mobile device server, sending messages to a mobile endpoint, the mobile endpoint utilized by a first user concurrently with a non-mobile endpoint, the method comprising:
- receiving a first message sent by a second user to the first user;
- sending the first message to the mobile endpoint and the non-mobile endpoint;
- receiving a second message sent by the first user from the non-mobile endpoint;
- in response, suspending a session with the mobile endpoint while continuing a session with the non-mobile endpoint;
- while the session with the mobile endpoint is suspended, receiving additional messages for the first user from users other than the first user and caching the additional messages for the first user from users other than the first user;
- sending the additional messages to the non-mobile endpoint and not the mobile endpoint while the session with the mobile endpoint is suspended;
- receiving a third message from the mobile endpoint and resuming the session with the mobile endpoint; and
- sending the additional messages to the mobile endpoint when the session with the mobile endpoint is resumed.

8. The method of claim 7, wherein the third message from the mobile endpoint comprises a notification regarding a user-initiated action.

9. The method of claim 8, wherein the notification regarding the user-initiated action comprises a message regarding a change in mobile device mode from an inactive mode to an active mode.

10. The method of claim 8, wherein the third message comprises a message to another user.

11. The method of claim 7, further comprising, before caching a selected message, comparing a sender of the selected message to an exclusion list, and sending the selected message to the mobile endpoint while the session is suspended if the sender is in the exclusion list.

12. The method of claim 11, further comprising, caching the selected message if the sender is not in the exclusion list.

13. The method of claim 12, further comprising receiving information from the first user to include in the exclusion list, and in response, including the information in the exclusion list.

14. The method of claim 7, further comprising, if the non-mobile endpoint becomes inactive, resuming the session with the mobile endpoint.

15. A mobile device server configured to send messages to a mobile device utilized by a first user, the mobile device server comprising:
- a processor; and
- memory comprising instructions stored thereon that are executable by the processor to communicate information received from a shared service with the mobile device by:
  - receiving a first message from the shared service, the first message sent by a second user;
  - sending the first message to the mobile device and a non-mobile device utilized by the first user;
  - receiving a second message from the shared service, the second message sent by the first user from the non-mobile device to a different user;
  - in response, suspending a session with the mobile device;
  - receiving a third message while the session is suspended;
  - comparing a sender of the third message to an exclusion list;
  - if the sender of the third message is not in the exclusion list, then caching the third message while the session with the mobile device is suspended;
  - receiving a fourth message from the mobile device and resuming the session with the mobile device; and
  - sending the third message to the mobile device when the session is resumed.

16. The mobile device server of claim 15, further comprising receiving information from the first user to include in the exclusion list, and adding the information to the exclusion list.

17. The mobile device server of claim 15, further comprising, if the sender is on the exclusion list, then sending the third message to the mobile device while the session is suspended.

18. The mobile device server of claim 15, wherein the fourth message sent by the mobile device comprises a notification regarding a user-initiated action.

19. The mobile device server of claim 18, wherein the notification regarding the user-initiated action comprises a notification of a change of mobile device mode from an inactive mode to an active mode.

20. The mobile device server of claim 18, wherein the fourth message comprises a message sent to another user.

* * * * *